(12) United States Patent
Wu et al.

(10) Patent No.: US 8,865,306 B2
(45) Date of Patent: Oct. 21, 2014

(54) INTERMEDIATE TRANSFER MEMBERS CONTAINING FLUORINATED POLYAMIC ACIDS

(75) Inventors: Jin Wu, Pittsford, NY (US); Lanhui Zhang, Webster, NY (US); Lin Ma, Pittsford, NY (US); Kock-Yee Law, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 220 days.

(21) Appl. No.: 13/482,976

(22) Filed: May 29, 2012

(65) Prior Publication Data
US 2013/0320272 A1 Dec. 5, 2013

(51) Int. Cl.
C08G 73/10 (2006.01)
H01B 1/24 (2006.01)
H01B 1/12 (2006.01)

(52) U.S. Cl.
USPC .................. 428/411.1; 399/121; 399/308

(58) Field of Classification Search
None
See application file for complete search history.

(56) References Cited

U.S. PATENT DOCUMENTS

| | | |
|---|---|---|
| 5,978,639 A | 11/1999 | Masuda et al. |
| 6,139,784 A | 10/2000 | Oshima et al. |
| 6,397,034 B1 | 5/2002 | Tarnawskyj et al. |
| 7,031,647 B2 | 4/2006 | Mishra et al. |
| 7,130,569 B2 | 10/2006 | Goodman et al. |
| 7,139,519 B2 | 11/2006 | Darcy, III et al. |
| 7,781,133 B2 | 8/2010 | Wu et al. |
| 2007/0025740 A1* | 2/2007 | Katoh et al. ............... 399/1 |
| 2008/0008838 A1* | 1/2008 | Arpac et al. ............... 427/386 |

* cited by examiner

Primary Examiner — Callie Shosho
Assistant Examiner — Patrick English
(74) Attorney, Agent, or Firm — Eugene O. Palazzo

(57) ABSTRACT

An intermediate transfer member that includes a fluorinated polyamic acid and a conductive component.

18 Claims, 1 Drawing Sheet

INTERMEDIATE TRANSFER MEMBERS CONTAINING FLUORINATED POLYAMIC ACIDS

This disclosure is generally directed to an intermediate transfer member that includes a fluorinated polyamic acid and an intermediate transfer member that contains a mixture of a fluorinated polyamic acid, an optional conductive filler component, and an optional polysiloxane.

BACKGROUND

There are known intermediate transfer members that include materials with characteristics that cause these members to become brittle resulting in inadequate acceptance of the developed image and subsequent partial transfer of developed xerographic images to a substrate like paper.

Also, known are intermediate transfer members that include a liquid fluoro agent, however, this agent is incompatible with polymers like polyimides obtained from polyamic acid coating solutions. The resulting polyimide phase separates and the releasing of the polyimide from the coating is difficult to control.

A disadvantage relating to the preparation of an intermediate transfer member is that there is usually deposited a separate release layer on a metal substrate, and thereafter there is applied to the release layer the intermediate transfer member components, and where the release layer allows the components to be separated from the member by peeling or by the use of mechanical devices. Thereafter, the intermediate transfer member components are in the form of a film, which can be selected for xerographic imaging systems, or where the film can be deposited on a supporting substrate like a polymer layer. The use of a separate intermediate release layer adds to the cost and to the time of preparation of intermediate transfer members, and such a layer can also modify a number of the intermediate transfer member characteristics.

Intermediate transfer members that enable acceptable registration of the final color toner image in xerographic color systems using synchronous development of one or more component colors, and using one or more transfer stations, are known. However, a disadvantage of using an intermediate transfer member in color systems is that a plurality of developed toner transfer operations is utilized, thus sometimes causing charge exchange between the toner particles and the transfer member, which ultimately can result in less than complete toner transfer. This can result in low resolution images on the image receiving substrate like paper, and image deterioration. When the image is in color, the image can additionally suffer from color shifting and color deterioration.

There is a need for intermediate transfer members that substantially avoid or minimize the disadvantages of a number of known intermediate transfer members.

Also, there is a need for oleophobic intermediate transfer member materials that possess self release characteristics from a number of substrates that are selected when such members are prepared, and that exhibit a high Young's modulus of, for example, from about 3,500 to about 10,000 Mega Pascals and an excellent break strength of, for example, a break strength from about 150 to about 300 MPa, or from about 175 to about 250 MPa.

Further, there is a need for intermediate transfer members which possess improved stability with no or minimal degradation for extended time periods.

Another need relates to intermediate transfer members that have excellent conductivity or resistivity leading to developed images with minimal resolution issues.

Additionally, there is a need for intermediate transfer member containing components that can be economically and efficiently manufactured, and where release additives and leveling agents are chemically incorporated into the intermediate transfer member coating composition.

Yet another need resides in providing intermediate transfer members where release additives need not be physically incorporated into the composition of the mixture in that such incorporation tends to form unwanted residues on metal substrates subsequent to release of the composition, and where a chemically interacted release agent eliminates the need for cleaning a release fluid from the intermediate transfer member after curing.

These and other needs are achievable in embodiments with the intermediate transfer members and components thereof disclosed herein.

SUMMARY

Disclosed is an intermediate transfer member comprising a fluorinated polyamic acid.

Also disclosed is an oleophobic intermediate transfer member comprising a fluorinated polyamic acid and a conductive component.

Further disclosed is an intermediate transfer member consisting of a fluorinated polyamic acid and a conductive component, wherein said fluorinated polyamic acid is generated by the reaction of a polyamic acid with a functionalized perfluoropolyether, wherein said polyamic acid is selected from the group consisting of the polyamic acid of pyromellitic dianhydride/4,4-oxydianiline and the polyamic acid biphenyl tetracarboxylic dianhydride/4,4'-oxydianiline, and the functionalized perfluoropolyether is a carboxylic acid terminated perfluoropolyether wherein the carboxylic acid groups of said carboxylic acid functionalized perfluoropolyether react with said polyamic acid, and which member is oleophobic with a hexadecane contact angle of from about 50 to about 90 degrees.

FIGURES

The following Figures are provided to further illustrate the intermediate transfer members disclosed herein.

EMBODIMENTS

There is disclosed herein an intermediate transfer member comprising a fluorinated polyamic acid, and mixtures or blends thereof with a number of polyamic acids.

The fluorinated polyamic acid enables or assists in enabling self release of an intermediate transfer member film from a substrate like a metal substrate, such as stainless steel, thereby avoiding the need for a separate release layer on the substrate.

More specifically, there is provided herein an intermediate transfer member comprising an oleophobic mixture, that is a lack of affinity for oil thus protecting the member from individual hands and fingers and allowing its reuse, and the other advantages illustrated herein in the configuration of a layer of a fluorinated polyamic acid, and where there is avoided the need for a separate release layer on the substrate.

Figure 1:
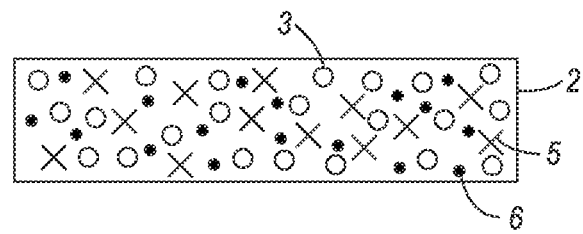
FIG. 1 illustrates an exemplary embodiment of a one-layer intermediate transfer member of the present disclosure.

In FIG. 1 there is illustrated an intermediate transfer member comprising a layer 2 of a fluorinated polyamic acid 3, an optional siloxane polymer 5, and an optional conductive component 6.

Figure 2:
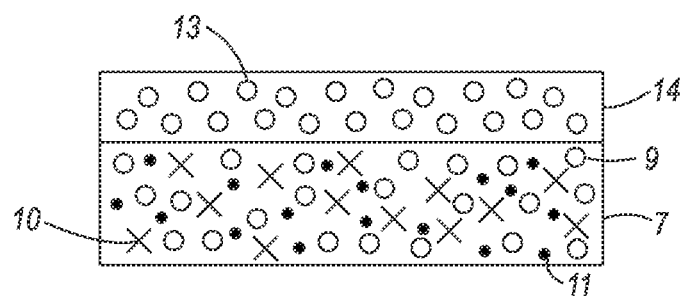
FIG. 2 illustrates an exemplary embodiment of a two-layer intermediate transfer member of the present disclosure.

In FIG. 2 there is illustrated a two-layer intermediate transfer member comprising a bottom layer 7 of a fluorinated polyamic acid 9, an optional siloxane polymer 10, and a conductive component 11, and an optional top or outer toner release layer 13 comprising release components 14.

Figure 3:
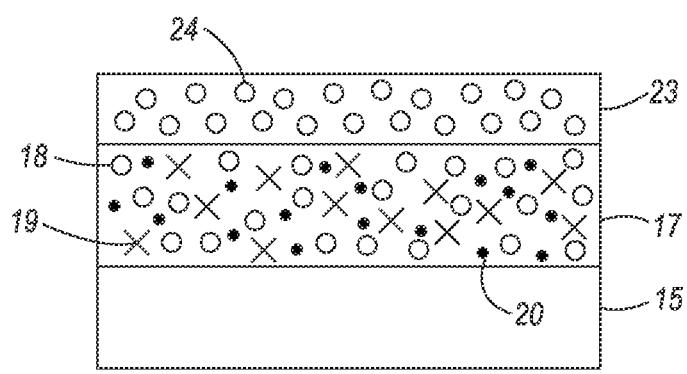
FIG. 3 illustrates an exemplary embodiment of a three-layer intermediate transfer member of the present disclosure.

In FIG. 3 there is illustrated a three layer intermediate transfer member comprising a supporting substrate 15, a layer 17 of a fluorinated polyamic acid 18, an optional siloxane polymer 19, and an optional conductive component 20, and an optional release layer 23 comprising release components 24.

There is disclosed a self-releasing oleophobic intermediate transfer member that generally comprises a fluorinated polyamic acid generated from a polyamic acid and a carboxylic acid functionalized perfluoropolyether (HOOC-PFPE-COOH); a conductive component, such as carbon black, and a polysiloxane. While not being desired to be limited by theory, ATR-FTIR spectra generated for the reacted mixture of the polyamic acid and the carboxylic acid functionalized perfluoropolyether (HOOC-PFPE-COOH) demonstrated that all the carboxylic acid groups of the carboxylic acid functionalized perfluoropolyether reacted, by heating or curing, with the polyamic acid.

The intermediate transfer members disclosed herein are oleophobic in that they exhibit excellent toner transfer and excellent cleaning efficiency, and they also exhibit self release characteristics, and where the use of an external release layer present on, for example, a stainless steel substrate is avoided; have excellent mechanical strength while permitting the rapid and complete transfer of from about 90 to about 99 percent, and from about 95 to about 100 percent transfer of a xerographic developed image; possess a Young's modulus of, for example, from about 3,500 to about 10,000 Mega Pascals (MPa), from about 5,000 to about 9,000 MPa, or from about 6,000 to about 8,000 MPa; a break strength of from about 150 to about 300 MPa, or from about 175 to about 250 MPa; a CTE (coefficient of thermal expansion) of from about 10 to about 50 ppm/° K, or from about 15 to about 30 ppm/° K; and an excellent resistivity as measured with a known High Resistivity Meter of, for example, from about $10^8$ to about $10^{13}$ ohm/square, from about $10^9$ to about $10^{13}$ ohm/square, from about $10^9$ to about $10^{12}$ ohm/square, or from about $10^{10}$ to about $10^{12}$ ohm/square.

Self-release characteristics without the assistance of any external sources, such as prying devices, permits the efficient, economical formation, and full separation, from about 90 to about 100 percent, and from about 95 to about 99 percent of the disclosed intermediate transfer member from metal substrates upon which the members are initially prepared in the form of a film, and where release materials and separate release layers can be avoided on the metal substrates. The time period to obtain the self-release characteristics varies depending, for example, on the components and the amounts thereof selected for the fluorinated polyamic acid containing compositions disclosed. Generally, however, this time period is from about 1 to about 60 seconds, from about 1 to about 45 seconds, from about 1 to about 30 seconds, from about 1 to about 20 seconds, or from 1 to about 5 seconds, and in some instances less than about 1 second.

The intermediate transfer members of the present disclosure can be provided in any of a variety of configurations, such as a one-layer configuration, or in a multi-layer configuration including, for example, a top release layer. More specifically, the final intermediate transfer member may be in the form of an endless flexible belt, a web, a flexible drum or roller, a rigid roller or cylinder, a sheet, a drelt (a cross between a drum and a belt), a seamless belt that is with an absence of any seams or visible joints in the members, and the like.

Polyamic Acids

Examples of polyamic acids selected for mixing with functionalized perfluoropolyethers (PFPE) include pyromellitic dianhydride/4,4'-oxydianiline, a polyamic acid of pyromellitic dianhydride/phenylenediamine, a polyamic acid of biphenyl tetracarboxylic dianhydride/4,4'-oxydianiline, a polyamic acid of biphenyl tetracarboxylic dianhydride/phenylenediamine, a polyamic acid of benzophenone tetracarboxylic dianhydride/4,4'-oxydianiline, a polyamic acid of benzophenone tetracarboxylic dianhydride/4,4'-oxydianiline/phenylenediamine, and the like, and mixtures thereof.

Commercially available examples of polyamic acids of pyromellitic dianhydride/4,4-oxydianilines are PYRE-MC) RC5019 (about 15 to about 16 weight percent in N-methyl-2-pyrrolidone, NMP), RC5057 (about 14.5 to about 15.5 weight percent in NMP/aromatic hydrocarbon, ratio of 80/20), and RC5083 (about 18 to about 19 weight percent in NMP/DMAc, ratio of 15/85), obtainable from Industrial Summit Technology Corporation, Parlin, N.J.; and DURIMIDE® 100, commercially available from FUJIFILM Electronic Materials U.S.A., Inc.

Examples of polyamic acids of biphenyl tetracarboxylic dianhydride/4,4'-oxydianilines that may be selected for the mixing and reaction with the PFPE for the disclosed intermediate transfer members include U-VARNISH A, and VARNISH S (about 20 weight in NMP), both available from UBE America Inc., New York, N.Y. Polyamic acids of biphenyl tetracarboxylic dianhydride/phenylenediamine examples include PI-2610 (about 10.5 weight in NMP), and PI-2611 (about 13.5 weight in NMP), both available from HD Micro-Systems, Parlin, N.J.

In further embodiments of the present disclosure, examples of polyamic acids or esters that can be utilized for the mixing and reaction with the functionalized PFPE can be generated by the reaction of a dianhydride and a diamine. Suitable dianhydrides selected for the reaction include aromatic dianhydrides and aromatic tetracarboxylic acid dianhydrides, such as, for example, 9,9-bis(trifluoromethyl)xanthene-2,3, 6,7-tetracarboxylic acid dianhydride, 2,2-bis(3,4-dicarboxyphenyl)hexafluoropropane dianhydride, 2,2-bis(3,4-dicarboxyphenoxy) phenyl)hexafluoropropane dianhydride, 4,4'-bis(3,4-dicarboxy-2,5,6-trifluorophenoxy) octafluorobiphenyl dianhydride, 3,3',4,4'-tetracarboxybiphenyl dianhydride, 3,3',4,4'-tetracarboxybenzophenone dianhydride, di-(4-(3,4-dicarboxyphenoxy)phenyl)ether dianhydride, di-(4-(3,4-dicarboxyphenoxy)phenyl) sulfide dianhydride, di-(3,4-dicarboxyphenyl)methane dianhydride, di-(3,4-dicarboxyphenyl)ether dianhydride, 1,2,4,5-tetracarboxybenzene dianhydride, 1,2,4-tricarboxybenzene dianhydride, butanetetracarboxylic dianhydride, cyclopentanetetracarboxylic dianhydride, pyromellitic dianhydride, 1,2,3,4-benzenetetracarboxylic dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 3,4,9,10-perylenetetracarboxylic dianhydride, 2,3,6,7-anthracene tetracarboxylic dianhydride, 1,2,7,8-phenanthrenetetracarboxylic dianhydride, 3,3',4,4'-biphenyltetracarboxylic dianhydride, 2,2',3,3'-biphenyltetracarboxylic dianhydride, 3,3',4-4'-benzophenonetetracarboxylic dianhydride, 2,2',3,3'-benzophenonetetracarboxylic dianhydride, 2,2-bis(3,4-dicarboxyphenyl)propane dianhydride, 2,2-bis(2,3-dicarboxyphenyl)propane dianhydride, bis(3,4-dicarboxyphenyl)ether dianhydride, bis(2,3-dicarboxyphenyl)ether dianhydride, bis(3,4-dicarboxyphenyl)sulfone dianhydride, bis(2,3-dicarboxyphenyl)sulfone 2,2-bis(3,4-dicarboxyphenyl)-1,1,1,3,3,3-hexafluoropropane dianhydride, 2,2-bis(3,4-dicarboxyphenyl)-1,1,1,3,3,3-hexachloropropane dianhydride, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)methane dianhydride, 4,4'-(p-phenylenedioxy)diphthalic dianhydride, 4,4'-(m-phenylenedioxy)diphthalic dianhydride, 4,4'-diphenylsulfidedioxybis(4-phthalic acid)dianhydride, 4,4'-diphenylsulfonedioxybis(4-phthalic acid)dianhydride, methylenebis(4-phenyleneoxy-4-phthalic acid)dianhydride, ethyl idenebis(4-phenyleneoxy-4-phthalic acid)dianhydride, isopropylidenebis-(4-phenyleneoxy-4-phthalic acid)dianhydride, hexafluoroisopropylidenebis(4-phenyleneoxy-4-phthalic acid)dianhydride, and the like.

Exemplary diamines selected for the reaction with the dianhydrides include 4,4'-bis-(m-aminophenoxy)-biphenyl, 4,4'-bis-(m-aminophenoxy)-diphenyl sulfide, 4,4'-bis-(m-aminophenoxy)-diphenyl sulfone, 4,4'-bis-(p-aminophenoxy)-benzophenone, 4,4'-bis-(p-aminophenoxy)-diphenyl sulfide, 4,4'-bis-(p-aminophenoxy)-diphenyl sulfone, 4,4'-diamino-azobenzene, 4,4'-diaminobiphenyl, 4,4'-diaminodiphenylsulfone, 4,4'-diamino-p-terphenyl, 1,3-bis-(gamma-aminopropyl)-tetramethyl-disiloxane, 1,6-diaminohexane, 4,4'-diaminodiphenylmethane, 3,3'-diaminodiphenylmethane, 1,3-diaminobenzene, 4,4'-diaminodiphenyl ether, 2,4'-diaminodiphenylether, 3,3'-diaminodiphenylether, 3,4'-diaminodiphenylether, 1,4-diaminobenzene, 4,4'-diamino-2,2',3,3',5,5',6,6'-octafluoro-biphenyl, 4,4'-diamino-2,2',3,3',5,5',6,6'-octafluorodiphenyl ether, bis[4-(3-aminophenoxy)-phenyl]sulfide, bis[4-(3-aminophenoxy)phenyl]sulfone, bis[4-(3-aminophenoxy)phenyl]ketone, 4,4'-bis(3-aminophenoxy)biphenyl, 2,2-bis[4-(3-aminophenoxy)phenyl]-propane, 2,2-bis[4-(3-aminophenoxy)phenyl]-1,1,1,3,3,3-hexafluoropropane, 4,4'-diaminodiphenyl sulfide, 4,4'-diaminodiphenyl ether, 4,4'-diaminodiphenyl sulfone, 4,4'-diaminodiphenylmethane, 1,1-di(p-aminophenyl)ethane, 2,2-di(p-aminophenyl) propane, 2,2-di(p-aminophenyl)-1,1,1,3,3,3-hexafluoropropane, and the like, and mixtures thereof.

The dianhydride and diamine reactants can be selected in various suitable amounts, such as for example a weight ratio of dianhydride to diamine of from about 20:80 to about 80:20, from about 40:60 to about 60:40, and about a 50:50 weight ratio.

The polyamic acids are selected in various effective amounts for the reaction or mixing with the functionalized PFPE. Generally, the amount of polyamic acid selected for the reaction is, for example, from about 50 to about 99 weight percent, from about 50 to about 95, from about 60 to about 95 weight percent, or from about 70 to about 90 weight percent, and where the ratio of the polyamic acid to the functionalized PFPE is, for example, from about 90:10, about 60:40, about 70:30, about 65:35, about 80:20, or about 50:50.

Functionalized Perfluoropolyethers (PFPE)

Examples of the functionalized perfluoropolyethers selected are carboxylic acid functionalized polyfluoropolyethers (HOOC-PFPE-COOH), examples of which are represented by

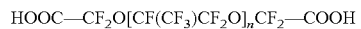

HOOC—CF$_2$O[CF(CF$_3$)CF$_2$O]$_n$CF$_2$—COOH

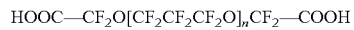

HOOC—CF$_2$O[CF$_2$CF$_2$CF$_2$O]$_n$CF$_2$—COOH

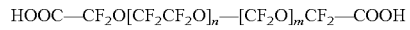

HOOC—CF$_2$O[CF$_2$CF$_2$O]$_n$—[CF$_2$O]$_m$CF$_2$—COOH or

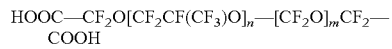

HOOC—CF$_2$O[CF$_2$CF(CF$_3$)O]$_n$—[CF$_2$O]$_m$CF$_2$—COOH wherein n represents the number of repeating segments, and is, for example, from about 3 to about 120, or from about 10 to about 60; m represents the number of repeating segments, and is, for example, from about 5 to about 120, or from about 10 to about 60, and the sum of n+m is, for example, from about 40 to about 180, or from about 90 to about 130, and the ratio of n/m is, for example, from about 0.5 to about 2, or from about 0.75 to about 1.

A specific example of carboxylic acid functionalized polyfluoropolyethers is FLUOROLINK® C with an average equivalent weight of about 1,000, and a fluorine content of about 61 percent.

Polysiloxane Polymers

The intermediate transfer member can also generally comprise a polysiloxane polymer. Examples of polysiloxane polymers selected for the intermediate transfer member mixture disclosed herein include known suitable polysiloxanes, such as a polyether modified polydimethylsiloxane, commercially available from BYK Chemical as BYK® 333, BYK® 330 (about 51 weight percent in methoxypropylacetate), and BYK® 344 (about 52.3 weight percent in xylene/isobutanol, ratio of 80/20); BYK®-SILCLEAN 3710 and BYK® 3720 (about 25 weight percent in methoxypropanol); a polyester modified polydimethylsiloxane, commercially available from BYK Chemical as BYK® 310 (about 25 weight percent in xylene) and BYK® 370 (about 25 weight percent in xylene/alkylbenzenes/cyclohexanone/monophenylglycol, ratio of 75/11/7/7); a polyacrylate modified polydimethylsiloxane, commercially available from BYK Chemical as BYK®-SILCLEAN 3700 (about 25 weight percent in methoxypropylacetate); a polyester polyether modified polydimethylsiloxane, commercially available from BYK Chemical as BYK® 375 (about 25 weight percent in di-propylene glycol monomethyl ether); and the like, and mixtures thereof.

The polysiloxane polymer, or copolymers thereof can be present in the intermediate transfer member mixture in various effective amounts, such as from about 0.01 to about 1 weight percent, from about 0.05 to about 1 weight percent, from about 0.05 to about 0.5 weight percent, or from about 0.1 to about 0.3 weight percent based on the weight of the solid components present in the mixture, such as of the mixture of the synthesized fluorinated polyamic acid, the polysiloxane polymer, and when present the conductive component.

Optional Fillers

Optionally, the intermediate transfer member may contain one or more fillers to, for example, alter and adjust the conductivity of the intermediate transfer member. Where the intermediate transfer member is a one layer structure, the conductive filler can be included in the fluorinated polyamic acid containing mixture disclosed herein. However, where the intermediate transfer member is a multi-layer structure, the conductive filler can be included in one or more layers of the member, such as in the supporting substrate, the polymer mixture layer coated thereon and in both the supporting substrate and the polymer mixture layer.

Any suitable filler can be used that provides the desired results. For example, suitable fillers include carbon blacks, metal oxides, polyanilines, other known suitable fillers, and mixtures of fillers.

Examples of carbon black fillers that can be selected for the intermediate transfer members illustrated herein include special black 4 (B.E.T. surface area=180 m$^2$/g, DBP absorption=1.8 ml/g, primary particle diameter=25 nanometers) available from Evonik-Degussa, special black 5 (B.E.T. surface area=240 m$^2$/g, DBP absorption=1.41 ml/g, primary particle diameter=20 nanometers), color black FW1 (B.E.T. surface area=320 m$^2$/g, DBP absorption=2.89 ml/g, primary particle diameter=13 nanometers), color black FW2 (B.E.T. surface area=460 m$^2$/g, DBP absorption=4.82 ml/g, primary particle diameter=13 nanometers), color black FW200 (B.E.T. surface area=460 m$^2$/g, DBP absorption=4.6 ml/g, primary particle diameter=13 nanometers), all available from Evonik-Degussa; VULCAN® carbon blacks, REGAL® carbon blacks, MONARCH® carbon blacks and BLACK PEARLS® carbon blacks available from Cabot Corporation. Specific examples of conductive carbon blacks are BLACK PEARLS® 1000 (B.E.T. surface area=343 m$^2$/g, DBP absorption=1.05 ml/g), BLACK PEARLS® 880 (B.E.T. surface area=240 m$^2$/g, DBP absorption=1.06 ml/g), BLACK PEARLS® 800 (B.E.T. surface area=230 m$^2$/g, DBP absorption=0.68 ml/g), BLACK PEARLS® L (B.E.T. surface area=138 m$^2$/g, DBP absorption=0.61 ml/g), BLACK PEARLS® 570 (B.E.T. surface area=110 m$^2$/g, DBP absorption=1.14 ml/g), BLACK PEARLS® 170 (B.E.T. surface area=35 m$^2$/g, DBP absorption=1.22 ml/g), VULCAN® XC72 (B.E.T. surface area=254 m$^2$/g, DBP absorption=1.76 ml/g), VULCAN® XC72R (fluffy form of VULCAN® XC72), VULCAN® XC605, VULCAN® XC305, REGAL® 660 (B.E.T. surface area=112 m$^2$/g, DBP absorption=0.59 ml/g), REGAL® 400 (B.E.T. surface area=96 m$^2$/g, DBP absorption=0.69 ml/g), REGAL® 330 (B.E.T. surface area=94 m$^2$/g, DBP absorption=0.71 ml/g), MONARCH® 880 (B.E.T. surface area=220 m$^2$/g, DBP absorption=1.05 ml/g, primary particle diameter=16 nanometers), and MONARCH® 1000 (B.E.T. surface area=343 m$^2$/g, DBP absorption=1.05 ml/g, primary particle diameter=16 nanometers); special carbon blacks available from Evonik Incorporated; and Channel carbon blacks available from Evonik-Degussa. Other known suitable carbon blacks not specifically disclosed herein may be selected as the filler or conductive component for the intermediate transfer members disclosed herein.

Examples of polyaniline fillers that can be selected for incorporation into the intermediate transfer member compositions are PANIPOL™ F, commercially available from Panipol Oy, Finland; and known lignosulfonic acid grafted polyanilines. These polyanilines usually have a relatively small particle size diameter of, for example, from about 0.5 to about 5 microns; from about 1.1 to about 2.3 microns, or from about 1.5 to about 1.9 microns.

Metal oxide fillers that can be selected for the disclosed intermediate transfer member composition include, for example, tin oxide, antimony doped tin oxide, indium oxide, indium tin oxide, zinc oxide, and titanium oxide, and the like.

When present, the filler can be selected in an amount of, for example, from about 1 to about 60 weight percent, from about 3 to about 40 weight percent, from about 4 to about 30 weight percent, from about 10 to about 30 percent, from about 3 to about 30 weight percent, from about 8 to about 25 weight percent, or from about 13 to about 20 weight percent of the total solids of the synthesized fluorinated polyamic acid, and the conductive component or filler.

Optional Release Layer

When desired, an optional release layer can be included in the intermediate transfer member, such as over the fluorinated polyamic acid layer mixture illustrated herein. The release layer may be included to assist in providing additional toner cleaning and further developed image transfer efficiency from a photoconductor to the intermediate transfer member.

When selected, the release layer can have any desired and suitable thickness. For example, the release layer can have a thickness of from about 1 to about 100 microns, about 10 to about 75 microns, or from about 20 to about 50 microns.

The optional release layer can comprise TEFLON®-like materials including fluorinated ethylene propylene copolymer (FEP), polytetrafluoroethylene (PTFE), polyfluoroalkoxy polytetrafluoroethylene (PFA TEFLON®), and other TEFLON®-like materials; silicone materials, such as fluorosilicones and silicone rubbers, such as Silicone Rubber 552, available from Sampson Coatings, Richmond, Va., (polydimethyl siloxane/dibutyl tin diacetate, 0.45 gram DBTDA per 100 grams polydimethyl siloxane rubber mixture, with a molecular weight $M_w$ of approximately 3,500); and fluoroelastomers, such as those sold as VITON®, such as copolymers and terpolymers of vinylidenefluoride, hexafluoropropylene, and tetrafluoroethylene, which are known commercially under various designations as VITON A®, VITON E®, VITON E60C®, VITON E45®, VITON E430®, VITON B910®, VITON GH®, VITON B50®, VITON E45®, and VITON GF®. The VITON® designation is a Trademark of E.I. DuPont de Nemours, Inc. Two known fluoroelastomers are comprised of (1) a class of copolymers of vinylidenefluoride, hexafluoropropylene, and tetrafluoroethylene, known commercially as VITON A®; (2) a class of terpolymers of vinylidenefluoride, hexafluoropropylene, and tetrafluoroethylene, known commercially as VITON B®; and (3) a class of tetrapolymers of vinylidenefluoride, hexafluoropropylene, tetrafluoroethylene, and a cure site monomer, such as VITON GF®, having 35 mole percent of vinylidenefluoride, 34 mole percent of hexafluoropropylene, and 29 mole percent of tetrafluoroethylene with 2 percent cure site monomer. The cure site monomers can be those available from E.I. DuPont de Nemours, Inc. such as 4-bromoperfluorobutene-1,1,1-dihydro-4-bromoperfluorobutene-1,3-bromoperfluoropropene-1,1,1-dihydro-3-bromoperfluoropropene-1, or commercially available cure site monomers.

Intermediate Transfer Member Formation

The intermediate transfer member mixtures illustrated herein comprising the generated fluorinated polyamic acid and a conductive filler component can be formulated into an intermediate transfer member by any suitable method. For example, with known milling processes, uniform dispersions of the intermediate transfer member mixtures can be obtained, heated and cured at from about 125° C. to about 400° C., from about 200° C. to about 350° C., or from about 160° C. to about 290° C. for a suitable period of time of, for example, from about 30 minutes to 120 minutes, or from about 45 minutes to about 100 minutes, to complete the reaction between the carboxylic acid groups of the carboxylic acid functionalized perfluoropolyether and the polyamic acid, and then coated on individual metal substrates, such as a stainless steel substrate or the like, using known draw bar coating or flow coating methods. The resulting individual film or films can be dried at high temperatures, such as by heating and curing the films at 190° C. for 30 minutes, 250° C. for 30 minutes, and 290° C. for 60 minutes, or generally curing by heating the intermediate transfer member mixture to from about 100° C. to about 400° C., from about 75° C. to about 320° C., or from about 160° C. to about 320° C., for a suitable period of time, such as from about 20 to about 180 minutes, from about 40 to about 120 minutes, or about 30 minutes to about 60 minutes while remaining on the substrates. After drying and cooling to room temperature, about 23° C. to about 25° C., the films self release from the steel substrates, that is the films release without any external assistance. The resultant intermediate transfer film product can have a thickness of, for example, from about 15 to about 150 microns, from about 20 to about 100 microns; or from about 25 to about 80 microns.

As metal substrates selected for the deposition of the mixture disclosed herein, there can be selected stainless steel, aluminum, nickel, copper, and their alloys, glass plates, and other conventional typical known materials.

Examples of solvents selected for formation of the intermediate transfer member compositions, which solvents can be selected in an amount of, for example, from about 60 to about 95 weight percent, or from about 70 to about 90 weight percent of the total mixture components weight include alkylene halides, such as methylene chloride, tetrahydrofuran, toluene, monochlorobenzene, N-methyl-2-pyrrolidone, N,N-dimethylformamide, N,N-dimethylacetamide, methyl ethyl ketone, dimethylsulfoxide (DMSO), methyl isobutyl ketone, formamide, acetone, ethyl acetate, cyclohexanone, acetanilide, mixtures thereof, and the like. Diluents can be mixed with the solvents selected for the intermediate transfer member mixtures. Examples of diluents added to the solvents in amounts of from about 1 to about 25 weight percent, and from 1 to about 10 weight percent based on the weight of the solvent and the diluent are known diluents like aromatic hydrocarbons, ethyl acetate, acetone, cyclohexanone and acetanilide.

Optional Supporting Substrates

If desired, a supporting substrate can be included in the intermediate transfer member, such as beneath the generated fluorinated polyamic acid containing layer. The optional supporting substrate can be included to provide increased rigidity or strength to the intermediate transfer member.

More specifically, examples of the intermediate transfer member supporting substrates are polyimides inclusive of known low temperature, and rapidly cured polyimide polymers, such as VTEC™ PI 1388, 080-051, 851, 302, 203, 201, and PETI-5, all available from Richard Blaine International, Incorporated, Reading, Pa., polyamideimides, polyetherimides, and the like The thermosetting polyimides can be cured at temperatures of from about 180° C. to about 260° C. over a short period of time, such as from about 10 to about 120 minutes, or from about 20 to about 60 minutes, and generally have a number average molecular weight of from about 5,000 to about 500,000 or from about 10,000 to about 100,000, and a weight average molecular weight of from about 50,000 to about 5,000,000 or from about 100,000 to about 1,000,000. Also, for the supporting substrate there can be selected thermosetting polyimides that can be cured at temperatures of above 300° C., such as PYRE M.L.® RC-5019, RC 5057, RC-5069, RC-5097, RC-5053, and RK-692, all commercially available from Industrial Summit Technology Corporation, Parlin, N.J.; RP-46 and RP-50, both commercially available from Unitech LLC, Hampton, Va.; DURIMIDE® 100, commercially available from FUJIFILM Electronic Materials U.S.A., Inc., North Kingstown, R.I.; and KAPTON® HN, VN and FN, all commercially available from E.I. DuPont, Wilmington, Del.

Examples of polyamideimides that can be selected as supporting substrates for the intermediate transfer members disclosed herein are VYLOMAX® HR-11NN (15 weight percent solution in N-methylpyrrolidone, $T_g$=300° C., and $M_w$=45,000), HR-12N2 (30 weight percent solution in N-methylpyrrolidone/xylene/methyl ethyl ketone=50/35/15, $T_g$=255° C., and $M_w$=8,000), HR-13NX (30 weight percent solution in N-methylpyrrolidone/xylene=67/33, $T_g$=280° C., and $M_w$=10,000), HR-15ET (25 weight percent solution in ethanol/toluene=50/50, $T_g$=260° C., and $M_w$=10,000), HR-16NN (14 weight percent solution in N-methylpyrrolidone, $T_g$=320° C., and $M_w$=100,000), all commercially available from Toyobo Company of Japan, and TORLON® AI-10 ($T_g$=272° C.), commercially available from Solvay Advanced Polymers, LLC, Alpharetta, Ga.

Examples of specific polyetherimide supporting substrates that can be selected for the intermediate transfer members disclosed herein are ULTEM® 1000 ($T_g$=210° C.), 1010 ($T_g$=217° C.), 1100 ($T_g$=217° C.), 1285, 2100 ($T_g$=217° C.), 2200 ($T_g$=217° C.), 2210 ($T_g$=217° C.), 2212 ($T_g$=217° C.), 2300 ($T_g$=217° C.), 2310 ($T_g$=217° C.), 2312 ($T_g$=217° C.), 2313 ($T_g$=217° C.), 2400 ($T_g$=217° C.), 2410 ($T_g$=217° C.), 3451 ($T_g$=217° C.), 3452 ($T_g$=217° C.), 4000 ($T_g$=217° C.), 4001 ($T_g$=217° C.), 4002 ($T_g$=217° C.), 4211 ($T_g$=217° C.), 8015, 9011 ($T_g$=217° C.), 9075, and 9076, all commercially available from Sabic Innovative Plastics.

Once formed, the supporting substrate can have any desired and suitable thickness. For example, the supporting substrate can have a thickness of from about 10 to about 300 microns, such as from about 50 to about 150 microns, from about 75 to about 125 microns, or about 80 microns.

The intermediate transfer members illustrated herein can be utilized for a number of printing and copying systems, inclusive of xerographic printing systems. For example, the disclosed intermediate transfer members can be incorporated into a multi-imaging xerographic machine where each developed toner image to be transferred is formed on the imaging or photoconductive drum at an image forming station, and where each of these images is then developed at a developing station, and transferred to the intermediate transfer member. The images may be formed on a photoconductor and developed sequentially, and then transferred to the intermediate transfer member. In an alternative method, each image may be formed on the photoconductor or photoreceptor drum, developed, and then transferred in registration to the intermediate transfer member. In an embodiment, the multi-image system is a color copying system, wherein each color of an image being copied is formed on the photoreceptor drum, developed, and transferred to the intermediate transfer member.

After the toner latent image has been transferred from the photoreceptor drum to the intermediate transfer member, the intermediate transfer member may be contacted under heat and pressure with an image receiving substrate such as paper. The toner image on the intermediate transfer member is then transferred and fixed, in image configuration, to the substrate such as paper.

Specific embodiments will now be described in detail. These examples are intended to be illustrative, and are not limited to the materials, conditions, or process parameters set forth in these embodiments. All parts are percentages by weight of total solids of all the components unless otherwise indicated.

COMPARATIVE EXAMPLE 1

A coating composition was prepared by stirring a mixture of special carbon black 4 obtained from Evonik-DeGussa Incorporated, and a polyamic acid of pyromellitic dianhydride/4,4-oxydianiline Pyre-M.L. RC5083 (about 18 to about 19 weight percent in the solvent mixture methyl-2-pyrrolidone, N,N-dimethylacetamide, NMP/DMAc, ratio of 15/85), obtainable from Industrial Summit Technology Corporation, Parlin, N.J., in a ratio of 15/85 based on the initial mixture feed amounts, in N-methyl-2-pyrrolidone (NMP), about 16 weight solids. The obtained intermediate transfer member dispersion was coated on a stainless steel substrate of a thickness of 0.5 millimeter, and subsequently the mixture was cured by heating at 125° C. for 30 minutes, 190° C. for 30 minutes, and 320° C. for 60 minutes. The resulting intermediate transfer member film comprised of the above components in the ratios indicated did not self release from the stainless substrate, but rather adhered to this substrate. After being immersed in water for 3 months, the intermediate transfer member film obtained eventually self released from the substrate.

Also, the above prepared intermediate transfer member was only slightly oleophobic with a hexadecane contact angle of 10 degrees.

EXAMPLE I

There was prepared by admixing with stirring using a ball mill, a PFPE modified polyamic acid coating composition generated from the reaction of the polyamic acid of pyromellitic dianhydride/4,4-oxydianiline, commercially available from Industrial Summit Technology Corporation, Parlin, N.J. with the trade name of Pyre-M.L. RC5083 and FLUOROLINK® C10 from Solvay Solexis, a carboxylic acid functionalized PFPE, at a weight ratio of 70/30 based on the initial mixture feed amounts, and special carbon black 4, obtained from Evonik-Degussa Incorporated, in N-methyl-2-pyrrolidone, about 16 weight solids. The weight ratio of the PFPE modified polyamic acid and the carbon black was about 85/15. The resulting mixture was then heated to 55° C. for 4 hours, followed by cooling to about 25° C., and a PFPE modified polyamic acid/carbon black coating was obtained.

The ATR-FTIR spectra showed that all the carboxylic acid groups of the carboxylic acid functionalized perfluoropolyether were reacted with the polyamic acid. For FLUOROLINK® C itself a clear peak at 1782.3/cm was observed for —COOH. The FTIR spectrum of the PFPE modified polyamic acid clearly showed that the 1782.3/cm peak disappeared, which indicated that the perfluoropolyether was chemically attached to the polyamic acid.

The above obtained intermediate transfer member coating dispersion was coated with a known drawn bar coater, on a stainless steel substrate of a thickness of 0.5 millimeter, and subsequently, the mixture was cured by heating at 125° C. for 30 minutes, 190° C. for 30 minutes, 250° C. for 30 minutes, and 290° C. for 60 minutes. The resulting intermediate transfer member comprised of the above ingredients of the PFPE modified polyamic acid and special carbon black 4, and in the ratios indicated, immediately self released, less than one second, from the stainless steel without the assistance of any external processes. There resulted an 80 micron thick smooth film of the above components in a weight ratio of 85 PFPE modified polyamic acid and 15 of the special carbon black.

EXAMPLE II

An intermediate transfer member is prepared by repeating the processes of Example I except there is selected for the polyamic acid a polyamic acid of biphenyl tetracarboxylic dianhydride/4,4'-oxydianiline (U-VARNISH A obtained from UBE America Inc.), a polyamic acid of biphenyl tetracarboxylic dianhydride/phenylenediamine (PI-2610 obtained from HD MicroSystems), a polyamic acid of benzophenone tetracarboxylic dianhydride/4,4'-oxydianiline (RP50 obtained from Unitech Corp.), or a polyamic acid of benzophenone tetracarboxylic dianhydride/4,4'-oxydianiline/phenylenediamine (PI-2525 obtained from HD MicroSystems).

MEASUREMENTS

The resistivity of the above Example I as measured using a High Resistivity Meter was about $6.4 \times 10^{10}$ ohm/sq.

Also, the above intermediate transfer members of Example I and the Comparative Example 1 were measured for Young's Modulus following the known ASTM D882-97 process. Samples (0.5 inch×12 inch) of each intermediate transfer member were placed in the Instron Tensile Tester measurement apparatus, and then the samples were elongated at a constant pull rate until breaking. During this time, there was recorded the resulting load versus the sample elongation. The Young's Modulus was calculated by taking any point tangential to the initial linear portion of the recorded curve results and dividing the tensile stress by the corresponding strain. The tensile stress was calculated by the load divided by the average cross sectional area of each of the test samples. Break strength was measured by the tensile stress when the sample broke.

The intermediate transfer members of Example I and Comparative Example 1 were further tested for their thermal expansion coefficients (CTE) using a Thermo-mechanical Analyzer (TMA). The intermediate transfer member samples were cut using a razor blade and metal die to 4 millimeter wide pieces which were then mounted between the TMA clamp using a measured 8 millimeter spacing. The samples were preloaded to a force of 0.05 Newtons (N). Data was analyzed from the $2^{nd}$ heat cycle. The CTE value was obtained as a linear fit through the data between the temperature points of interest of from about a −20° C. to about 50° C. regions using the TMA software.

The CTE for the Example I member was about 40 ppm/° K, and for the Comparative Example 1 member the CTE was about 30 ppm/° K.

After being released from the stainless steel substrate, the Example I intermediate transfer film obtained can be used as an intermediate transfer member or an optional release layer can be coated on top of the Example I intermediate transfer layer.

The hexadecane contact angle, which translates into the degree of oleophobic characteristics, was at ambient temperature (about 23° C.) measured by using the Contact Angle System OCA (Dataphysics Instruments GmbH, model OCA15). At least ten measurements were performed, and their averages are reported. For example, the oleophobic characteristics of the Example I member measured a hexadecane contact angle of about 66 degrees, higher than the about 45 degrees of a PTFE film alone, 56 to 61 higher than the hexadecane contact angle for a known polyimide intermediate transfer member of about 5 to 10 degrees and 56 degrees higher than the Comparative Example 1 member.

Hexadecane contact angles for the intermediate transfer members disclosed can be from about 50 to about 120, from about 55 to about 90, from about 50 to about 90, or from about 60 to about 70 degrees.

All of the above results are summarized in the following Table 1.

TABLE 1

|  | CTE (ppm/K) | Young's Modulus (MPa) | Break Strength (MPa) | Hexadecane Contact Angle |
|---|---|---|---|---|
| Comparative Example 1 | 30 | 6,000 | 163 | 10 degrees |
| Example I | 40 | 5,600 | 147 | 66 degrees |

Also, the intermediate transfer member of Example I self released quickly from the stainless substrate without the need to apply an additional release layer on the stainless steel, while the Comparative Example 1 did not self release and remained on the stainless steel substrate, being released only after immersed in water for three months.

The Example I intermediate transfer member was obtained at a lower cost, about 50 percent lower than a number of known intermediate transfer members that were free of a fluorinated polyamic acid in that the Example I member does not require an added release layer coating on a stainless steel substrate when the member is initially prepared.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. An intermediate transfer member comprising a layer consisting of a fluorinated polyamic acid generated by the reaction of a polyamic acid with a functionalized perfluoropolyether, wherein the functionalized perfluoropolyether is represented by

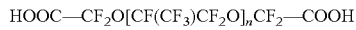
   HOOC—CF$_2$O[CF(CF$_3$)CF$_2$O]$_n$CF$_2$—COOH

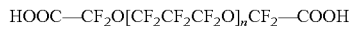
   HOOC—CF$_2$O[CF$_2$CF$_2$CF$_2$O]$_n$CF$_2$—COOH

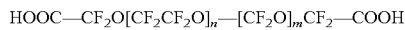
   HOOC—CF$_2$O[CF$_2$CF$_2$O]$_n$—[CF$_2$O]$_m$CF$_2$—COOH or

   HOOC—CF$_2$O[CF$_2$CF(CF$_3$)O]$_n$—[CF$_2$O]$_m$CF$_2$—COOH wherein n is from about 3 to about 120, m is from about 5 to about 120, and carbon black.

2. The intermediate transfer member in accordance with claim 1 wherein said member is oleophobic.

3. The intermediate transfer member in accordance with claim 1 wherein said polyamic acid is selected from the group consisting of the polyamic acid of pyromellitic dianhydride/4,4-oxydianiline and the polyamic acid of biphenyl tetracarboxylic dianhydride/4,4'-oxydianiline.

4. The intermediate transfer member in accordance with claim 1 wherein the functionalized perfluoropolyether is represented by

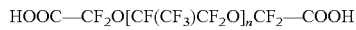
   HOOC—CF$_2$O[CF(CF$_3$)CF$_2$O]$_n$CF$_2$—COOH wherein n is from about 3 to about 120, m is from about 5 to about 120, and the polyamic acid is selected from the group consisting of a polyamic acid of pyromellitic dianhydride/4,4'-oxydianiline, a polyamic acid of pyromellitic dianhydride/phenylenediamine, a polyamic acid of biphenyl tetracarboxylic dianhydride/4,4'-oxydianiline, a polyamic acid of biphenyl tetracarboxylic dianhydride/phenylenediamine, a polyamic acid of benzophenone tetracarboxylic dianhydride/4,4'-oxydianiline, a polyamic acid of benzophenone tetracarboxylic dianhydride/4,4'-oxydianiline/phenylenediamine, and mixtures thereof.

5. The intermediate transfer member in accordance with claim 1 wherein said polyamic acid is pyromellitic dianhydride/4,4-oxydianiline and wherein for said functionalized perfluoropolyether n is from about 10 to about 60, m is from about 10 to about 60, and the ratio of n/m is from about 0.5 to about 2.

6. The intermediate transfer member in accordance with claim 1 wherein the ratio of said polyamic acid to said functionalized perfluoropolyether is about 90/10, about 80/20, about 70/30, or about 50/50.

7. The intermediate transfer member in accordance with claim 1 wherein the ratio of said polyamic acid to said functionalized perfluoropolyether is about 70/30.

8. The intermediate transfer member in accordance with claim 1 wherein said polyamic acid is selected in an amount of from about 50 to about 95 weight percent, and said functionalized perfluoropolyether is selected in an amount of from about 5 to about 50 weight percent based on the total of about 100 percent.

9. The intermediate transfer member in accordance with claim 1 wherein the carboxylic acid groups of said carboxylic acid functionalized perfluoropolyether react with said polyamic acid by heating.

10. The intermediate transfer member in accordance with claim 1 wherein said carbon black is present in an amount of from about 3 to about 40 weight percent based on the total of said ingredients in said member being about 100 percent.

11. The intermediate transfer member in accordance with claim 1 wherein the member has a resistivity of from about $10^9$ to about $10^{13}$ ohm/square.

12. The intermediate transfer member in accordance with claim 1 and wherein said member is in the form of a film and self releases from a metal substrate, and wherein said member has a hexadecane contact angle of from about 50 to about 120 degrees.

13. The intermediate transfer member in accordance with claim 1 and wherein said member has a hexadecane contact angle of from about 55 to about 90 degrees.

14. An oleophobic intermediate transfer member comprising a layer consisting of a fluorinated polyamic acid and a conductive component of carbon black, wherein said fluorinated polyamic acid is generated by the reaction of a polyamic acid with a functionalized perfluoropolyether and wherein the functionalized perfluoropolyether is represented by

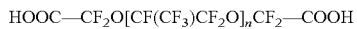
   HOOC—CF$_2$O[CF(CF$_3$)CF$_2$O]$_n$CF$_2$—COOH

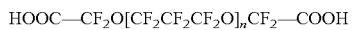
   HOOC—CF$_2$O[CF$_2$CF$_2$CF$_2$O]$_n$CF$_2$—COOH

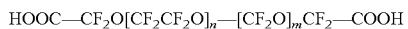
   HOOC—CF$_2$O[CF$_2$CF$_2$O]$_n$—[CF$_2$O]$_m$CF$_2$—COOH or

   HOOC—CF$_2$O[CF$_2$CF(CF$_3$)O]$_n$—[CF$_2$O]$_m$CF$_2$—COOH wherein n is from about 3 to about 120, m is from about 5 to about 120.

15. The intermediate transfer member in accordance with claim 14 wherein wherein for said functionalized perfluoropolyether n is from about 10 to about 60, m is from about 10 to about 60, and the ratio of n/m is from about 0.5 to about 2.

16. The intermediate transfer member in accordance with claim 14 wherein said polyamic acid is selected from the group consisting of a polyamic acid of pyromellitic dianhydride/4,4'-oxydianiline, a polyamic acid of pyromellitic dianhydride/phenylenediamine, a polyamic acid of biphenyl tetracarboxylic dianhydride/4,4'-oxydianiline, a polyamic acid of biphenyl tetracarboxylic dianhydride/phenylenediamine, a polyamic acid of benzophenone tetracarboxylic dianhydride/4,4'-oxydianiline, and a polyamic acid of benzophenone tetracarboxylic dianhydride/4,4'-oxydianiline/phenylenediamine.

17. The intermediate transfer member in accordance with claim 14 wherein said polyamic acid is pyromellitic dianhydride/4,4-oxydianiline, and said functionalized perfluoropolyether is HOOC—CF$_2$O[CF(CF$_3$)CF$_2$O]$_n$CF$_2$—COOH or HOOC—CF$_2$O[CF$_2$CF$_2$CF$_2$O]$_n$CF$_2$—COOH wherein n is from about 10 to about 60, m is from about 10 to about 60, and the ratio n/m is from about 0.5 to about 2.

18. An intermediate transfer member comprising a layer consisting of a fluorinated polyamic acid, a polysiloxane, and carbon black, wherein said fluorinated polyamic acid is generated by the reaction of a polyamic acid with a functionalized perfluoropolyether, wherein said polyamic acid is selected from the group consisting of the polyamic acid of pyromellitic dianhydride/4,4-oxydianiline and the polyamic acid biphenyl tetracarboxylic dianhydride/4,4'-oxydianiline, and the functionalized perfluoropolyether is a carboxylic acid terminated perfluoropolyether wherein the carboxylic acid groups of said carboxylic acid functionalized perfluoropolyether react with said polyamic acid, and which member is oleophobic with a hexadecane contact angle of from about 50 to about 90 degrees and wherein the functionalized perfluoropolyether is represented by HOOC—CF$_2$O[CF(CF$_3$)CF$_2$O]$_n$CF$_2$—COOH HOOC—CF$_2$O[CF$_2$CF$_2$CF$_2$O]$_n$CF$_2$—COOH HOOC—CF$_2$O[CF$_2$CF$_2$O]$_n$—[CF$_2$O]$_m$CF$_2$—COOH or HOOC—CF$_2$O[CF$_2$CF(CF$_3$)O]$_n$—[CF$_2$O]$_m$CF$_2$—COOH wherein n is from about 3 to about 120, and m is from about 5 to about 120.

* * * * *